United States Patent [19]

Prescott

[11] Patent Number: 5,093,719

[45] Date of Patent: Mar. 3, 1992

[54] ENDOSCOPIC GRADIENT INDEX OPTICAL SYSTEMS

[75] Inventor: Rochelle Prescott, Summerfield, Fla.

[73] Assignee: Manx Optical Corporation, Summerfield, Fla.

[21] Appl. No.: 425,294

[22] Filed: Oct. 23, 1989

[51] Int. Cl.⁵ .............................................. G02B 23/00
[52] U.S. Cl. ........................................ 358/98; 359/652
[58] Field of Search .......................... 358/98, 225, 211; 350/413, 506; 128/4, 6

[56] References Cited

U.S. PATENT DOCUMENTS

| | | | |
|---|---|---|---|
| 3,801,181 | 4/1974 | Kitano | 350/413 X |
| 3,936,149 | 2/1976 | Imai | 350/413 |
| 4,515,444 | 5/1985 | Prescott et al. | 350/413 |
| 4,641,927 | 2/1987 | Prescott et al. | 350/413 |
| 4,735,491 | 4/1988 | Takahashi | 350/413 |
| 4,895,433 | 1/1990 | Takahashi et al. | 350/413 |

OTHER PUBLICATIONS

"Refractive Index Changes Produced in Glass by Ion Exchange", *Ceramic Bulletin*, vol. 49, #11, French et al., Nov. '70, pp. 974–977.

Primary Examiner—Victor R. Kostak
Attorney, Agent, or Firm—Francis J. Caufield

[57] ABSTRACT

Gradient index endoscopic or borescopic systems in forms ranging from basic to more complex depending on the optical task. The basic form comprises a gradient index objective of less than a quarter period in length followed by a gradient index relay whose length is at least one-quarter period longer than the distance of the first image of the object into the relay. The numerical aperture of the objective is preferably larger than that of the relay to provide a wide angle endoscope with an "entrance aperture tunnel" preceding the objective. In one embodiment with a line-of-view prism the entrance tunnel is placed in the most restricted aperture within the prism thus minimizing or eliminating vignetting of the field of view. A second embodiment of this subsystem is an endomicroscope wherein the entrance pupil moves and changes size as the ocular focus of the system is changed. The endoscope retains the maximum possible Lagrangian of the system as limited by the numerical aperture and diameter of the relay for all foci.

21 Claims, 6 Drawing Sheets

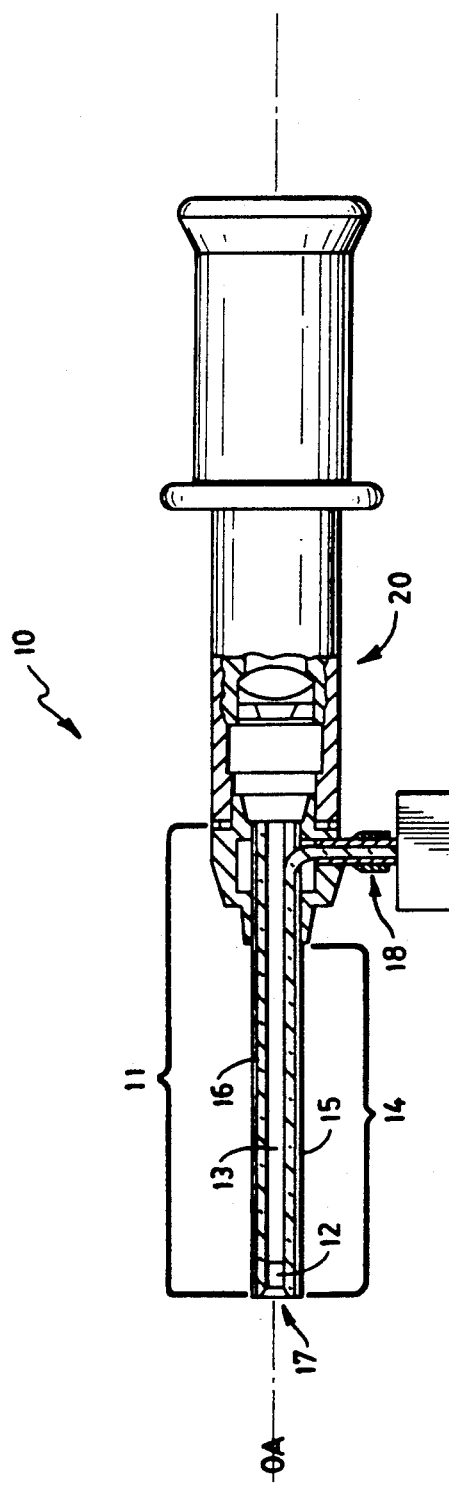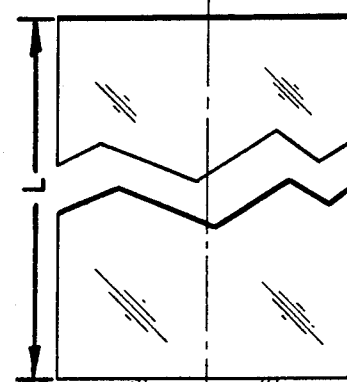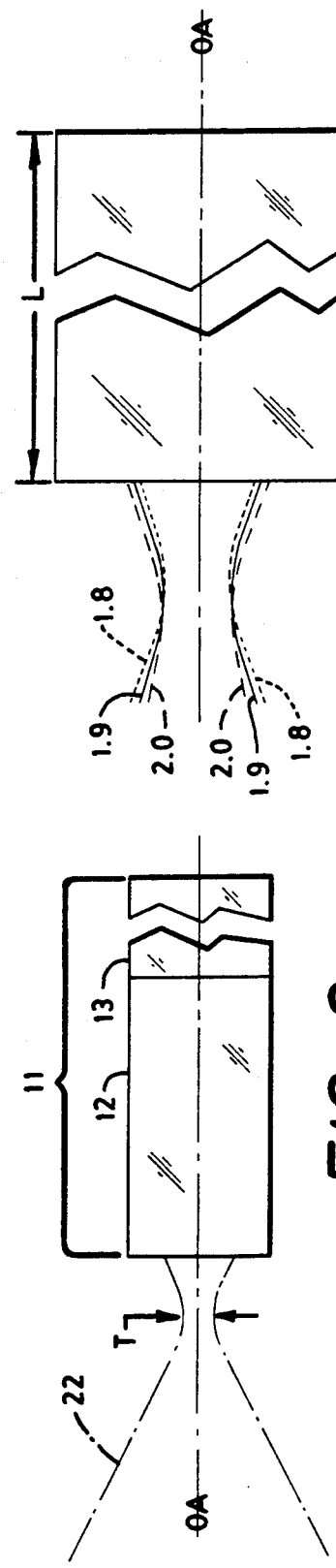

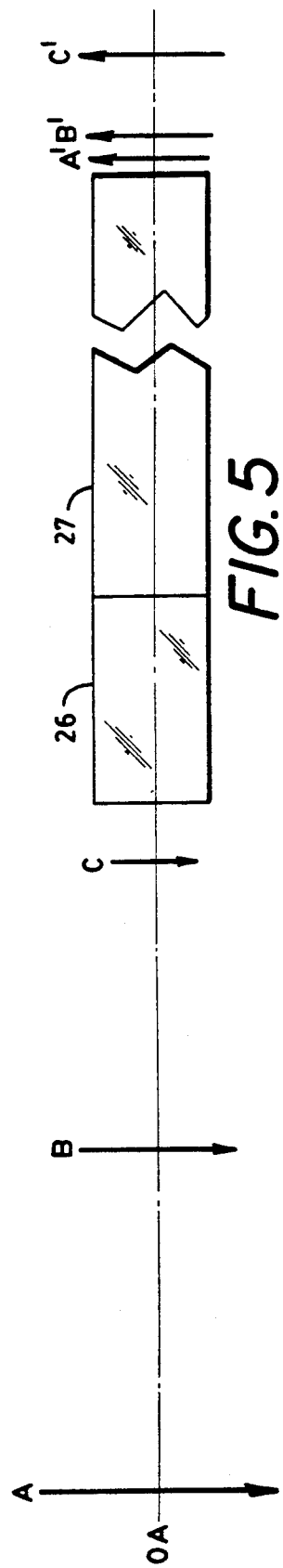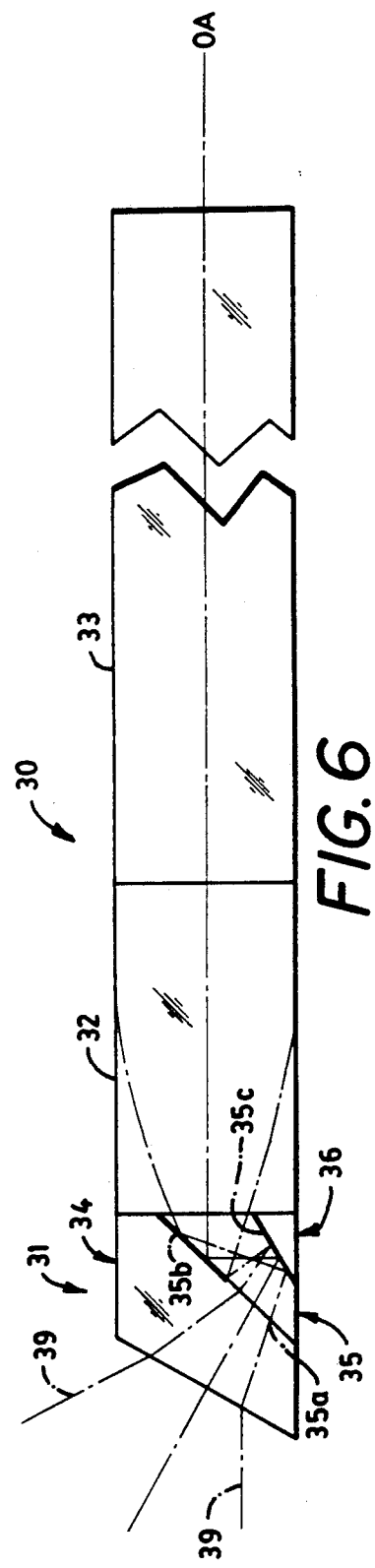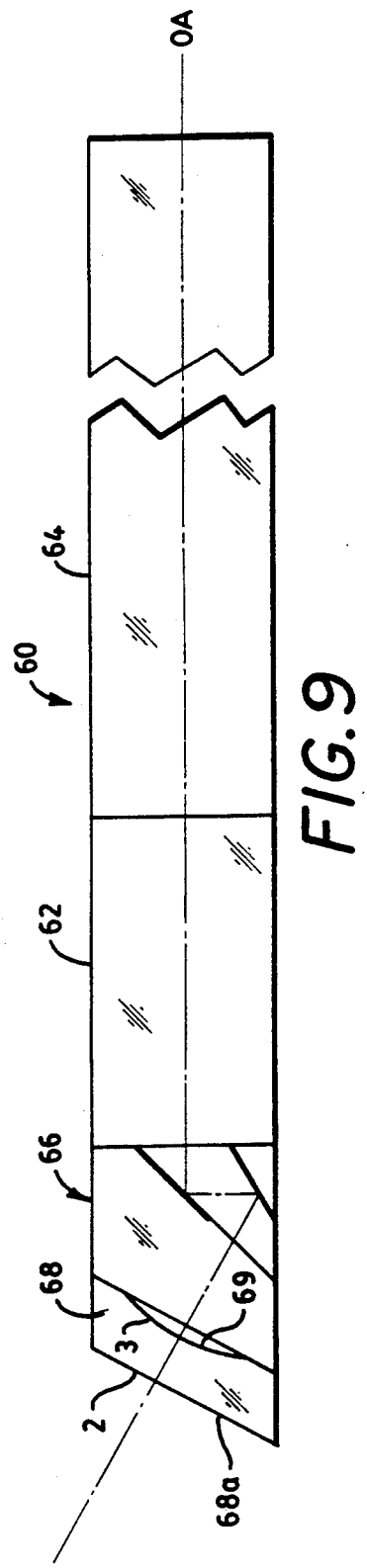

ENDOSCOPIC GRADIENT INDEX OPTICAL SYSTEMS

BACKGROUND OF THE INVENTION

1. Field of the Invention

This invention in general relates to endoscopes and in particular to endoscopic systems which employ gradient index elements.

2. Description of the Prior Art

The term endoscope refers to a broad class of optical instruments used in medical and industrial applications, wherein they are known as borescopes, to visualize what would otherwise be impossible to see with the unaided eye. In the medical field, they are passed through natural or surgically created openings in the body to examine interior organs or cavities and to perform surgical and biopsy procedures. Their less well known industrial applications include their widespread use for inspecting the interiors of a variety of devices including engine cylinders, pipes, boilers, and the like.

Because they are used to visualize the interior of objects through small openings, endoscopes are inherently long in relation to their diameters. In their simplest, and undoubtedly, oldest form they are nothing more than a rigid tube open at both ends with lighting for the object provided either at the distal end (near the object) or shone down the tube from the proximal end (near the observer).

More complex versions, which are improvements on the simple tube, are small telescopes or periscopes that are made up of a series of elements usually including an objective lens which forms an image near the distal end. The objective is then followed by a series of relay and field lenses which transfer this image to a location near the proximal end where it is observed through an ocular or falls on a videocamera sensor and is viewed on a monitor. Lighting is again provided by tiny bulbs near the distal end or piped from the proximal end to the object with fiber optics or other illumination schemes. Where something other than direct line viewing is required, line-of-sight prisms are used at the distal end to change the direction of view away from the longitudinal axis of the instrument.

More recently, graded or gradient index optical elements have been used in endoscopes to perform objective and relay tasks where small caliber (2 mm or less) instruments are required to examine or operate in small spaces such knee or even smaller joints such as the wrist, ankle, or temporal-mandibular joint. For these small caliber applications, graded index optical elements represent a practical and economic solution compared with their homogeneous counterparts. With homogeneous materials of necessarily variable geometry, both initial fabrication at the required scale and their subsequent assembly in proper alignment as an instrument is difficult and expensive. In contrast, graded index elements, which are made of inhomogeneous materials, have a regular right circular cylindrical geometry which permits them to be easily aligned as in-line monolithic assemblies. Thus, for small caliber applications, graded index materials are superior because of geometric advantages.

In addition to scale and ease of assembly, endoscopes of gradient index elements can be cemented together to provide slender systems that are sealed throughout their length to eliminate the possibility for entry into the optical path of dust, moisture, or other foreign matter which could have deleterious effects on performance or function.

Graded index optical elements of the type used in endoscopic systems are commercially available with a variety of properties that are well understood by those practicing in the optical arts. Computer programs are widely available for computing designs employing such elements exclusively and in hybrid systems in combination with homogeneous lenses.

Graded index elements of cylindrical symmetry, often referred to as GRIN rods, have an approximately quadratic variation of index of refraction or, in any case, a radial variation in index that is describable mathematically as a polynomial of even ordered terms of the radius with the coefficients related to index variation. Such elements are available in the United States from NSG America under the tradename SELFOC®. In these rods, or fibers as they are sometimes called, a meridional ray follows a sinusoidal or helicoid (spiral) path as it travels through the element. The length over which the sinusoid or helicoid goes through one complete cycle is referred to as a period and is easily calculable from literature supplied by manufacturers or available in scientific publications. If the ends of such a rod are polished flat and perpendicular to its axis, then an image of an object at a distance from the end of the rod is formed at intervals of one-half period, alternatingly inverted and erect along the rod.

NSG America markets two distinct types of GRIN rod in diameters from 0.35 mm to 2.70 mm. One type is a relatively high numerical aperture rod which is generally cut to a length equal to or somewhat greater than one-quarter period so that an object at a moderate distance from one end is imaged on the other end. This type is called an Imaging SELFOC® Micro Lens (ISLW).

The other common type is of relatively low numerical aperture and long period length. It is called a SELFOC® Rod Lens (SRL) and is nominally cut to a length of one-half period or an integral number of periods up to as many as six or more in some diameters. NSG America also supplies these lenses assembled with or without end cover glasses and with or without thin stainless steel tubing outer coverings so that they can be directly assembled into larger, heavier tubing with a fiberoptic light guide to illuminate the field of view. With a suitable ocular, generally a compound microscope, these assemblies are often used in endoscopes or borescopes.

In some applications, a videosensor is directly coupled with gradient index endoscopes by suitable optics so that the object field may be viewed on a video monitor screen.

Although advantageous in many respects, endoscopes or borescopes employing strictly gradient index elements are not without limitations. One of the these is that they are useful for viewing only directly along the axis of the optical system. In many cases, it is more desirable to view to one side or at an oblique angle. In conventional endoscopes, this problem is solved with an angle-of-view prism, a prism that changes the direction of sight. Conventional endoscopes and borescopes are commonly available with the direction of view departing from straight ahead by oblique angles as large as 120 degrees. It is also usually desirable to have a field of view in air of a minimum of 40 degrees or more and, preferably, of 80 to 100 degrees. Additionally, the angle of view is reduced by about one-fourth by immersion in water.

In conventional endoscopes, both problems are usually solved by designs employing a suitable prism, with or without a field-widener lens preceding the prism. It is common to design such prisms with two internal reflections to maintain proper reversion of the field of view. Many such line-of-view prisms, particularly all of those in the very popular range of 20 to 60 degrees, have narrow apertures inherent in their design so that only a very restricted ray bundle will pass through them. This problem is solved in endoscopes with homogeneous optics by having a reversed retrofocus objective with an external pupil preceding the first element. This pupil, which is much smaller than the diameter of the relay optics, is positioned within the prism so that the narrow prism apertures do not vignette the field of view. If a further increase in the field of view is desired, a negative lens can then be placed on the distal face of the prism. With conventional gradient index endoscopes of previous practice, which consist of an objective section followed by a relay section, the combination is such that its entrance pupil is inside of the objective itself. Consequently, a line-of-view prism such as those used in conventional endoscopes with homogeneous optics severely vignettes the field of view.

One solution to the above problem is disclosed in U.S. Pat. No. 4,515,444 issued to Rochelle Prescott and Dennis C. Leiner on May 7, 1985 and entitled "OPTICAL SYSTEM". Here, use was made of a spacer of homogeneous optical material placed between two gradient index lenses, an objective and a relay. This system has the disadvantage of somewhat reducing the Lagrangian of the system below the value otherwise limited by the relay system. Inclusion of the spacer also adds an additional system component thus increasing complexity and cost.

A second solution is that disclosed in U.S. Pat. No. 4,735,491 issued to Susumu Takahashi on Apr. 5, 1988 and entitled "OPTICAL SYSTEMS FOR ENDOSCOPES". Here, however, the objective is of conventional homogeneous lenses, and the system therefore no longer has the advantages of the simplicity of construction possible with the solid monolithic structure of a gradient index system.

None of the known solutions have recognized or understood how to provide a gradient index endoscopic system that minimizes and even eliminates vignetting by the apertures of a preceding line-of-view prism or other preceding potentially vignetting aperture. It is therefore a primary object of the present invention to provide such a system.

It is another object of the present invention to provide an endomicroscope whose only change in optics takes place at the ocular or proximate end by refocussing or changing the optics.

It is yet another object of the present invention to provide an endomicroscope whose probe section, as distinguished from the ocular or a camera used with it, may be hermetically sealed and immersible in the usual disinfecting solutions of surgical practice, or, in borescope applications, sealed against the entry of dust and moisture.

It is still another object of the present invention to provide an endoscope having its first internal image formed at some location that is not a cemented or glass-air interface.

Still another object of the invention is to provide a method for designing such endoscopic systems.

Other objects of the invention will in part be obvious and in part appear hereinafter. The invention, accordingly, comprises the methods and apparatus possessing the construction, combination of elements, and arrangement of parts exemplified in the following detailed disclosure.

SUMMARY OF THE INVENTION

This invention in general relates to endoscopes and in particular to small caliber endoscopes and endomicroscopes utilizing gradient index optical elements. The embodiments disclosed represent a range in form from basic to more complex depending on the task to be performed, but all include a gradient index objective and relay and are based on the recognition that gradient index systems have what I have discovered and call an "entrance tunnel", which is the image in object space of those apertures downlight of the objective which define the limiting light ray bundles from all points in the object field. I have found the entrance tunnel to be of paramount importance in the design of gradient index endoscopic systems and also how it can be selectively scaled and positioned by controlling the lengths of the gradient index objective and relay.

The basic form of the invention comprises a gradient index objective of less than one-quarter period in length and a relay element whose length is at least one-quarter period longer than the distance of the first image of the object into the relay. In this system, the entrance tunnel is uplight, outside of the objective lens. The position and dimensions of this entrance tunnel may be controlled to a considerable degree by the length of the objective and, in particular, it may be positioned so that its narrowest dimension is at the narrowest restriction of line-of-view prisms preceding the objective. This minimizes or eliminates vignetting by the prism apertures.

A second property of the basic form of the invention permits a new class of endomicroscopes that do not require changing distal end optics to convert from a wide field endoscope to an endomicroscope. This permits the probe end to be completely sealed from surrounding environments and allows for easy conversion between the microscope and wide-angle modes. These forms are based on the observation that the image location in the basic system can vary with changing object distance and can still be conveniently observed at the distal end with minimal focus changes in the ocular or final imaging optics.

In all previous designs of endomicroscopes, the conversion from a wide field endoscope, with an appreciable object distance, to a relatively high magnification microscope, with a relatively short working distance, either entailed a movement of the objective optics relative to the relay optics or a relative movement of one or more of the elements of the objective optics. This is no longer required. It should be noted that, in the conversion from a wide field endoscope to an endomicroscope, it is necessary that the distal end of the instrument move from a position some distance from the object to very close to the object and, as a practical matter, this latter position is usually chosen to be the tip of the endoscope in contact with the object, although any intermediate position may be used with a correspondingly intermediate magnification.

One embodiment disclosed in this invention is an endomicroscope that is unique in that the only change in the optics takes place entirely at the proximal end by refocussing or by changing the ocular optics. As the focus is changed, the aperture (and also the numerical aperture) of the objective changes in such a manner that the full Lagrangian of the relay is always utilized. This innovation results in a much simpler, more functional instrument. In this embodiment, the entire probe, as distinguished from the ocular or camera, can be hermetically sealed and immersed in the usual disinfecting solutions of surgical practice or, in the case of borescopes, sealed against the entry of dirt or moisture.

A third aspect of the invention has to do with the removal of an existing limitation in all known previous designs of GRIN endoscopes. In previous designs, the first image within the system appears to have always been placed on or near the first surface of the relay. Such a limitation is not necessary, or even desirable, since placing the internal images at an appreciable distance from cemented or glass-air surfaces greatly reduces the cosmetic requirements for these surfaces. Small defects such as dust, edge chips or bubbles no longer require rejection for cosmetic reasons. Another advantage without this limitation is greater flexibility in design layout and, if desired, greater magnification of the final image produced by the relay.

DESCRIPTION OF THE DRAWINGS

The novel features that are considered characteristic of the invention are set forth with particularity in the appended claims. The invention itself, however, both as to its organization, method of operation and design, together with other objects and advantages thereof will best be understood from the following description of the illustrated embodiments when read in connection with the accompanying drawings wherein like numbers have been employed in the different figures to denote the same parts and wherein:

FIG. 1 is a side elevation view of the basic form of the endoscopic system of the invention shown with parts partially in section;

FIG. 2 is a drawing showing in diagrammatic fashion selected portions of the basic form of the inventive endoscopic system along with what is referred to as its entrance aperture tunnel, a property of the invention discovered by the applicant;

FIG. 3 is a diagram illustrating how the characteristics of the entrance tunnel of embodiments of the invention can be changed by varying the length of their gradient index objective;

FIG. 5 is an illustration showing how image location and magnification vary as object distance FIG. 6 shows embodiment of the invention employing a line-of-view prism along with the paths traveled by selected rays as they pass through it;

FIG. 9 is an embodiment of the invention with a line-of-sight prism and a field widening lens preceding

DETAILED DESCRIPTION

Figure 4:
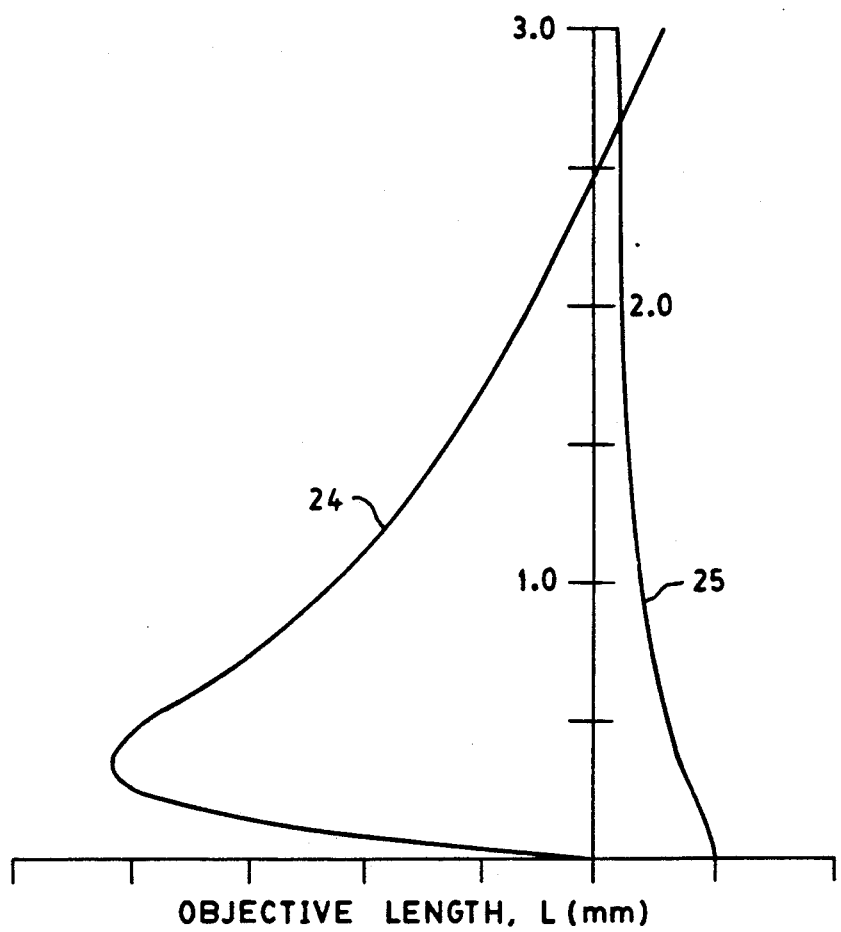
FIG. 4 is a plot which illustrates how the height and position of the throat of the entrance tunnel vary as the length of the objective is changed.

The embodiments of the invention to be disclosed represent a range in form from basic to more complex depending on the task to be performed and include small caliber endoscopes and endomicroscopes. Although their complexity differs, all comprise a gradient index objective and relay and are based on the recognition that gradient index systems have what I have discovered and call an "entrance tunnel", which is the three dimensional uplight image of the structure downlight of the objective which defines the limiting light ray bundles from all points in the object field. The three dimensional structure which limits the rays from the entire field of view is termed the entrance aperture tunnel of the system and is not to be equated to what is commonly referred to in connection with conventional optical system as the entrance aperture, which is the aperture defining the extreme rays of the axial ray bundle at a position where the chief ray crosses the axis. That is, the entrance aperture of a conventional system exists only at a single plane while the entrance aperture tunnel of the inventive systems exists in three dimensions. Moreover, I have found the entrance tunnel to be of paramount importance in the design of gradient index endoscopic systems, and also how it can be selectively scaled and positioned by controlling the lengths of the gradient index objective and relay.

In geometric terms, the graded index elements used in all the inventive embodiments are right circular cylinders and hence possess axial and cylindrical symmetry in form and in index distribution. They are often referred to as GRIN rods by those practicing in the optical arts and have an approximately quadratic variation of index of refraction radially or in any case a variation in index that is describable mathematically as a polynomial of even ordered radial terms with the coefficients related to overall element index parameters. To a first approximation the index of refraction varies in a quadratic fashion, and it is usually described mathematically as:

$$n_r = n_o(1 - Ar^2/2),$$

where $n_r$ = refractive index at any point r,
$n_o$ = refractive index on the optical axis,
A = refractive index (quadratic) gradient constant at the wavelength of use.
r = radial distance of any point on the lens from the optical axis, its dimensions are in millimeters.

Thus, although the geometry advantageously remains that of a right circular cylinder, the index of refraction is dependent only on radial distance assuming cylindrical coordinates.

Such GRIN elements are available in the United States from NSG America under the tradename SELFOC®. In these rods, or fibers as they are sometimes called, a meridional ray follows a sinusoidal path as it travels through the element. The length over which the sinusoid goes through one complete cycle is referred to as a period and is easily calculable from literature supplied by manufacturers or available in scientific publications. The period, sometimes called the pitch, due to a parabolic index variation, for example, is given by:

$$Z = 2\pi\sqrt{A} \text{ (mm)}.$$

and is wavelength dependent whereas lens length is, of course, constant.

If the ends of such a rod are polished flat and perpendicular to its axis, then an object at a distance from one end of the rod is imaged along the rod at intervals of one-half period, alternatingly inverted and erect.

FIG. 1 shows a cutaway view of a typical endoscope 10 employing the basic form of the invention. It is seen to comprise an objective-relay section 11 made of gradient index components of the type just described. The penetrating portion 14 is housed in a length of hypodermic tubing 15 which includes a small bundle of optical fibers 16 that are brought from the tip 17 to a sidearm 18 for connection to a fiberoptic light guide which is suitably illuminated by a light source at the opposite end, both of which are well-known and indicated generally at 19. The image formed by the objective-relay section 11 is viewed by a compound microscope 20 or other suitable ocular. Alternatively, the image may be picked up by a video sensor and displayed on a monitor.

As best seen in FIG. 2, the basic form of the invention comprises a gradient index objective 12 of less than one-quarter period in length and a relay element 13 whose length is at least one-quarter period longer than the distance of the first image of the object into the relay. In this system, the entrance tunnel, which is indicated at 22, is uplight and outside of objective lens 12. The position and dimensions of entrance tunnel 22 may be controlled to a considerable degree by the length of objective 12 and, in particular, it may be positioned so that its narrowest dimension, T, referred to as its throat, is at the narrowest restriction of any restrictions preceding objective 12. Knowing this, one simply places the throat at the position of any preceding restricting apertures to minimize or eliminate vignetting by those apertures.

FIG. 3 illustrates—for a particular combination of objective and relay lens—how the entrance tunnel, whose throat is always uplight and outside the objective in embodiments of the invention, can be caused to vary in size and position by changing the length, L, of the objective. In FIG. 3, the length of the objective corresponding to each entrance tunnel is given in millimeters and is seen to vary from 1.8 mm to 2.0 mm which is less than one-quarter period or 2.45 mm for the objective illustrated in this particular case. What I have found is that the entrance aperture tunnel of a simple GRIN rod system consisting of the inventive combination of an objective of approximately one-quarter period or less and a relay of more than one-quarter period is of the form of a hyperboloid of revolution of one sheet symmetric about the axis of the system and, also, symmetric about the plane of the entrance aperture for an object at infinity. In these systems, the entrance aperture stop is always one-quarter period downlight in the relay from the first image therein.

This tunnel is completely filled with the ray bundles from the field of view at any object distance and is defined by the limiting rays of such bundles. The limiting rays of such bundles can be established in a number of ways including the use of conventional ray tracing techniques well-known to those in the optical arts, or alternatively, by employing y, $\bar{y}$ analytical techniques—somewhat less conventional but, nevertheless, still applicable.

For a particular pair of GRIN components, FIG. illustrates how the position and height of the throat change with objective length, the ordinate. Here, curve 24 represents change of throat position while curve 25 gives its change height. As will be shown, these two parameters completely characterize the entrance tunnel for a given objective-relay system. The entrance pupil, the position in object space of the entrance stop or its image, for an object at infinity is at the smallest diameter of this tunnel, the throat, and, for objects at shorter distances, moves slowly downlight. For objectives of exactly one-quarter period, the throat is at the first surface of the objective and, as the objective is made shorter than this, it gradually moves uplight and slowly increases in diameter. This distance becomes a maximum for an objective of somewhat less than 0.1 radian length, again using one particular pair of GRIN components to illustrate the principle. It then rapidly returns to zero. At the same time, the diameter of the throat increases, slowly at first, then rapidly, reaching a maximum of the diameter of the elements at zero length. The angular extent of the field of view varies with the reciprocal of the height of the tunnel throat.

A remarkable property of the entrance aperture for these systems is that its height, h, at any point is readily calculated as the square root of the sum of the squares of the axial ray and of the chief ray at that surface.

$$h = \sqrt{(y^2 + \bar{y}^2)} \quad (1)$$

This equation is true for all object distances.

The exact mathematical description of this tunnel is given by:

$$y^2/a^2 - (x - x_o)^2/b^2 = 1 \quad (2)$$

where:

$$x_o = (y \times \bar{y}_o)/H \quad (2a)$$

and H is the Lagrangian of the relay element. Here, the x-axis is taken as the optical axis of the system, and the y-axis is in the median plane of the paraxial ray trace. $x_o$ is the distance from the first surface of the objective to the entrance pupil; a is the height of the entrance pupil, both for an object at infinity; and $-a/b$ is the tangent of the chief ray for an object at infinity. The asymptotes to the two hyperbolas in the paraxial plane are:

$$y = a(x - x_o)/b \text{ and } y = -a(x - x_o)/b \quad (3),$$

and they correspond to the chief rays for an object at infinity.

If a prism with flat faces perpendicular to the optical axis is placed in contact with the first surface of the objective, the above equations are still valid for the entrance pupil tunnel, which is the extreme ray bundle in object space, except that x must be measured from the first surface of the prism. To calculate the entrance aperture tunnel within the prism in this case, it is necessary to use methods analogous to those used in the calculation of the tunnel diagram of a prism.

In any system with lenses and or prisms uplight of the objective, if it is desired to check the tolerances of the system for possible vignetting by apertures preceding the objective, it is simple to put reference surfaces at each of these apertures and to calculate the extreme ray at these surfaces by for mula (1). Any vignetting that occurs due to such apertures may then be reduced to a minimum by suitable changes of the position of the entrance aperture by adjustment of the length of the objective.

A second property of the basic form of the invention permits a new class of endomicroscopes that do not require changing distal end optics to convert from a wide field endoscope to effect magnification changes. This permits the probe end to be completely sealed from surrounding environments and allows for easy conversion between the microscope and wide-angle modes. These embodiments are based on the observation that the image location in the basic system can vary with changing object distance and can still be conveniently observed at the distal end with minimal focus changes in the ocular or final imaging optics. FIG. 5 illustrates this property where it can be seen that, for an objective 26 of less than one-quarter period and a relay 27 of one-half period, images, A', B', and C' for objects, A, B, and C, respectively, move downlight along the optical axis, OA, as the objects are nearer the front face of objective 26, while at the same time the magnification changes greatly. As indicated, the change in the final image positions, A', B', and C' are small and easily accommodated by a minimal adjustment of a following ocular or relay lens.

In all previous designs of endomicroscopes, the conversion from a wide field endoscope, with an appreciable object distance, to a relatively high magnification microscope, with a relatively short working distance, either entailed a movement of the objective optics relative to the relay optics or a relative movement of one or more of the elements of the objective optics. This is no longer required. It should be noted that, in the conversion from a wide field endoscope to an endomicroscope, it is necessary that the distal end of the instrument move from a position some distance from the object to very close to the object and, as a practical matter, this latter position is usually chosen to be at the tip of the endoscope in contact with the object, as the depth of field of any microscope is very small. A cover glass of proper thickness is thus preferably a part of the design for this application.

Thus, inventive endomicroscopes have a unique property which permit refocussing or changes in ocular optics to take place entirely at the proximal end. As the focus is changed, the aperture (and also the numerical aperture) of the objective changes in such a manner that the full Lagrangian of the relay is always utilized. Consequently, much simpler and more functional instruments are possible with this innovation. Moreover, this advantageously means that the entire probe, as distinguished from the ocular or camera, can be hermetically sealed and immersed in the usual disinfecting solutions of surgical practice or, in the case of borescopes, sealed against the entry of dirt or moisture.

A third aspect of my invention relates to the removal of an existing limitation in all known previous designs of GRIN endoscopes. The limitation eluded to is the apparent need of having the first image within the system fall on or near the first surface of the relay. This limitation is not necessary, or even desirable, since placing the internal images at an appreciable distance from cemented or glass-air surfaces greatly reduces the cosmetic requirements for these surfaces. Small defects such as dust, edge chips, or bubbles no longer require rejection for cost reasons. Another advantage of removing this limitation is greater flexibility in design layout and, if desired, changing the magnification of the final image produced by the relay.

FIG. 6 shows an example of an embodiment of the basic form of the invention incorporating a line-of-view prism. Here, a small caliber endoscope probe 30 comprises an objective 32 followed by a relay 33. Ahead of relay 33 is a three piece, 30-degree, line-of-view prism 31 consisting of three elements 34, 35, and 36 which cause the optical axis OA to be deviated in object space by 30 degrees. Two lines 39 indicate the chief rays from an object as they enter and pass through the transmitting portion 35a of element 35. After reflection from the surface 35c of element 35, the beam travels up and is reflected from the reflecting area 35b of element 35. The light, having been deviated by 30 degrees to the axis of the GRIN system, then enters objective 32.

Figure 7:
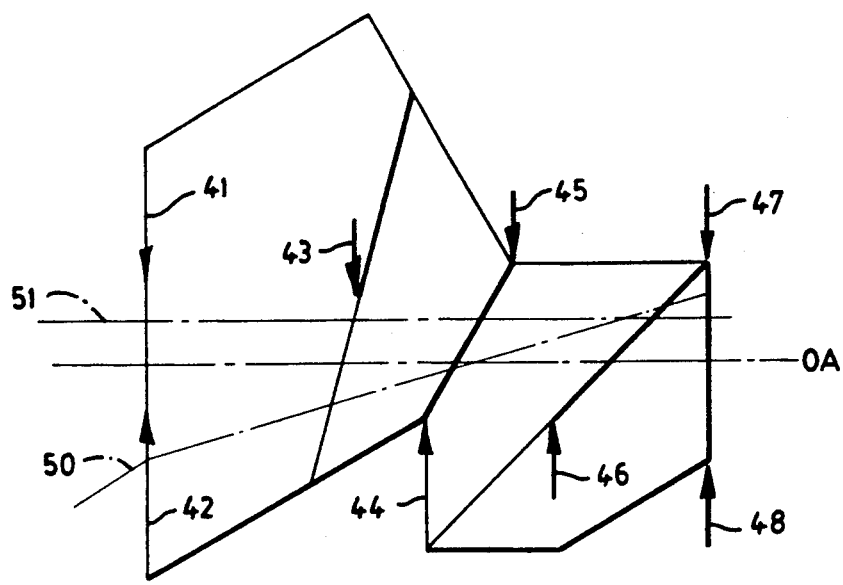
FIG. 7 is a tunnel diagram of the prism of FIG. with the restrictive apertures of the three piece prism indicated.

FIG. 7 is a tunnel diagram of prism 31 of FIG. 6. The arrows 41 through 48 indicate the positions of the restricting apertures. Also shown are a chief ray 0 and an axial ray 51 from the system of FIG. 6, an endoscope of reasonably wide angle. It is obvious that severe vignetting will occur. However, all GRIN endoscope systems have been shown to have unavoidable vignetting at all field angles progressing to 100 per cent at the edge of the field. All that can be done because of this inherent property is to design a system that will not increase the vignetting. How this can be accomplished is one of the primary teachings of this invention as will be appreciated from the discussion hereinafter.

Figure 8:
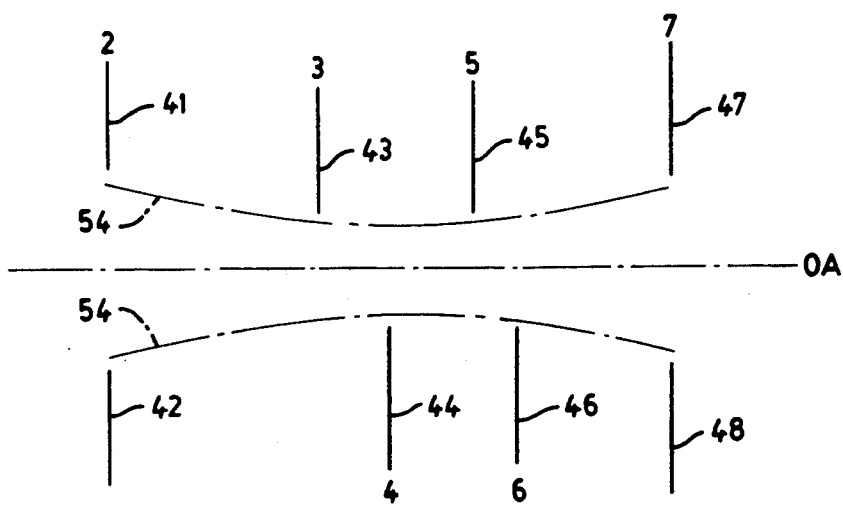
FIG. 8 is a simplified diagram of the prism apertures for the line-of-view prism of FIG. 6 with the position of the entrance tunnel indicated.

FIG. 8 is a simplified diagram showing the apertures at the reference surfaces for the apertures shown in FIG. 7 together with a plot of the entrance aperture tunnel 54 for the optimized objective. As will be appreciated, nowhere does tunnel 54 become vignetted by any of the potentially restricting apertures of prism 31. This is possible only because the basic combination of the lengths of the objective and relay assure that the entrance tunnel is outside of, or uplight, of the objective, and its position and size have been manipulated to avoid these vignetting apertures by adjustment of the objective length. It is important to realize that entrance aperture tunnel 54 represents the image of the walls of the relay and that no rays which intersect these lines can pass through the system. The numbers 41 through 48 refer to the same restrictions that these numbers refer to in FIG. 7. However, there is an additional series of numbers (2 through 7, without lead lines) which are assigned to reference surfaces in the ray trace of the system in the first embodiment. As will be demonstrated in the ray traces of the various embodiments, the entrance tunnel, here 54, will be completely filled with the imaging bundles of light from an object at any distance and any light rays falling outside it will not get through the system.

Below is a table of the paraxial constants for the component materials in all of the embodiments of this disclosure:

| PARAXIAL CONSTANTS FOR COMPONENT MATERIALS | | |
|---|---|---|
| MATERIAL (ACRONYM) | INDEX | PERIOD, mm |
| Schott LaSFN18 (913324) | 1.913 | Homogeneous |
| SELFOC ® 1 mm ISLW (ISLW) | 1.6117 | 9.805 |
| SELFOC ® 1 mm SRL (SRL) | 1.6052 | 44.0884 |
| Norland 61 Adhesive (NOR61) | 1.56 | Homogeneous |

| COMPONENTS TABLE FOR LINE-OF-SIGHT PRISM EMBODIMENT | | |
|---|---|---|
| COMPONENT | THICKNESS | GLASS |
| 30-Degree Prism | 1.5306 | LaSFN18 |
| Objective | 1.86 | ISLW |
| Relay | 88.18 | SRL |

Note
All refractive surfaces are plano in this example.

Ray trace data, giving not only axial and chief ray heights but also the apertures (for surfaces 2 through 7 the heights at the restrictive apertures of the prism) as well as the extreme ray (the corresponding height of the entrance aperture tunnel), is shown below:

| PARAXIAL RAY PLOT OF A GRIN OBJECTIVE-RELAY SYSTEM WITH A THREE PIECE 30 DEGREE LINE-OF-VIEW PRISM | | | | | | |
|---|---|---|---|---|---|---|
| | | | Heights | | | |
| Surface | Thickness | Glass | Axial Ray | Chief Ray | Aperture Height | Extreme Ray |
| 0 | 100000 | AIR | 0.0000 | −47832.0 | — | — |
| 1 | 0.4364 | AIR | 0.1187 | 0.0007 | — | 0.1187 |
| 2 | 0.5754 | 913324 | 0.1187 | −0.2095 | 0.5774 | 0.2408 |
| 3 | 0.1882 | 913324 | 0.1187 | −0.0647 | 0.1542 | 0.1359 |
| 4 | 0.2330 | 913324 | 0.1187 | −0.0173 | 0.1366 | 0.1200 |
| 5 | 0.1128 | 913324 | 0.1187 | 0.0414 | 0.1542 | 0.1258 |
| 6 | 0.4212 | 913324 | 0.1187 | 0.0698 | 0.2670 | 0.1377 |
| 7 | 1.86 | ISLW | 0.1187 | 0.1758 | 0.2670 | 0.2122 |
| 8 | 0.6172 | SRL | 0.0439 | 0.4983 | 0.5000 | 0.5002 |
| 9* | 11.0221 | SRL | 0.0000 | 0.4966 | 0.5000 | 0.5000 |
| 10** | 76.5375 | SRL | −0.5000 | 0.0027 | 0.5000 | 0.5000 |
| 11 | 0.3854 | AIR | 0.0000 | 0.4983 | — | 0.5002 |

*First internal image of object
**Aperture stop

For this data, the object is for practical purposes at infinity, surface 1 is the entrance pupil and surfaces 2–7 are the reference surfaces of the line-of-view prism. The objective is 1,1919 radians in length, and the relay two periods in length. The aperture heights and the distances between the critical reference surfaces in the prism are taken from a large scale plot. By careful optimization of the length of the objective in successive ray traces, the clearance at surfaces 3 and 5 have been balanced within two micrometers. Any appreciable change in the length of the objective will cause the entrance tunnel to move along the optical axis so that one or more of the prism apertures will cause vignetting of the image. A change in object distance will, in general, cause changes in both the axial and chief ray heights at the reference surfaces in the prism but no changes in the entrance tunnel; all of the distances determined by the images and aperture stop position will change with object distance. It is advisable, when tolerances are as small as in this case, to try to modify the overall design of the system to improve them and, in any case, run real ray traces from the edge of the field to improve the accuracy of the system model.

The relay length is a nominal two periods here and in all following examples. There is no reason that any other reasonable length cannot be specified in order to achieve a more desirable image position or magnification.

FIG. 9 shows an example of a wide angle, small caliber endoscope probe 60 in combination with a line-of-sight prism 66. In this example, the objective is indicated at 62, the relay at 64, the prism at 66, and a negative field widening lens is shown at 68. The numbers 2 and 3 in the figure refer to the first surface of the field widener lens 68 and to the first surface of a lens 69 of Norland 61 Adhesive, which is formed in the sagitta of the concave downlight surface (3) of field widener lens 68. Such a design is first optimized without the field widening lens as described above then the field widening lens is added.

Ray tracing data for endoscope 60 of FIG. 9 is given in the following table:

| PARAXIAL RAY PLOT OF A GRIN OBJECTIVE-RELAY SYSTEM WITH A THREE PIECE 30 DEGREE LINE-OF-VIEW PRISM AND FIELD WIDENER LENS | | | | | | |
|---|---|---|---|---|---|---|
| | | | Heights | | | |
| Surface | Thickness | Glass | Axial Ray | Chief Ray | Aperture Height | Extreme Ray |
| 0 | 100000 | AIR | 0.0000 | −52245.0 | — | — |
| 1 | −0.6196 | AIR | 0.1095 | −0.0005 | — | 0.1095 |
| 2 | 0.2770 | 913324 | 0.1095 | 0.3233 | 0.5774 | 0.3413 |
| 3 | 0.1088 | NOR61 | 0.1095 | 0.2476 | 0.3000 | 0.2707 |
| 4 | 0.5754 | 913324 | 0.1107 | −0.2140 | 0.5774 | 0.2410 |
| 5 | 0.1882 | 913324 | 0.1162 | −0.0693 | 0.1542 | 0.1353 |
| 6 | 0.2330 | 913324 | 0.1180 | −0.0219 | 0.1366 | 0.1200 |
| 7 | 0.1128 | 913324 | 0.1202 | 0.0367 | 0.1542 | 0.1257 |
| 8 | 0.4212 | 913324 | 0.1213 | 0.0651 | 0.2670 | 0.1377 |
| 9 | 1.86 | ISLW | 0.1253 | 0.1711 | 0.2670 | 0.2121 |

-continued

PARAXIAL RAY PLOT OF A GRIN OBJECTIVE-RELAY SYSTEM
WITH A THREE PIECE 30 DEGREE LINE-OF-VIEW PRISM
AND FIELD WIDENER LENS

| Surface | Thickness | Glass | Heights | | | |
|---|---|---|---|---|---|---|
| | | | Axial Ray | Chief Ray | Aperture Height | Extreme Ray |
| 10 | 0.8818 | SRL | 0.0627 | 0.4963 | 0.5000 | 0.5003 |
| 11* | 11.0221 | SRL | 0.0000 | 0.5000 | 0.5000 | 0.5000 |
| 12** | 76.2726 | SRL | −0.5000 | 0.0021 | 0.5000 | 0.5000 |
| 13 | 0.5524 | AIR | 0.0627 | 0.4963 | — | 0.5003 |

Note:
Surface 3 has a curvature of 0.47.
*Internal image of object
**Aperture stop For this ray trace, the object is for practical purposes at infinity, as in the first embodiment, and surface 1 is the entrance pupil. Surfaces 4–9 are the reference surfaces of the line-of-view prism. The objective length and relay length for this embodiment are also 1.1919 radians, one-half period, respectively. The aperture heights and the distances between the critical reference surfaces in the prism are the same. The effective change in object distance due to the field widener lens does cause changes in both the axial and chief ray heights at the reference surfaces in the prism but no change in the extreme ray; all of the distances determined by the images and aperture stop position will change with object distance.

Figure 10:
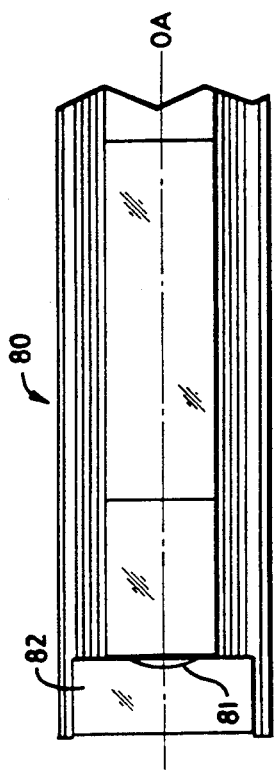
FIG. 10 is an endomicroscope embodiment of the invention with a cover glass and spacer preceding the objective.

FIG. 10 shows the front end of an embodiment in the form of an endomicroscope 70. Objective 73 and relay 74 form a two-element GRIN system based on the principles of the invention and designed as a wide field, low numerical aperture endoscope probe which can be converted to a narrow field, large numerical aperture endomicroscope simply by modifying the ocular so that the point of focus is changed. Frontal lighting is provided via a fiber optic bundle 75 and a stepped cover glass (71 and 72) provides a means of front illumination by a separate fiber optic bundle 76 when tissue is in contact with the front surface of the cover glass. This latter feature, however, is not necessary for other applications of the inventive endomicroscope but has been included here as an example of how one would provide proper lighting for examination of tissue or other materials in contact with a cover glass. Constructional data is as follows:

COMPONENT TABLE FOR CONVERTIBLE
ENDOMICROSCOPE FORM

| Surface | Curvature | Thickness | Glass |
|---|---|---|---|
| 1 | 0 | 1.00 | 913324 |
| 2 | 0 | 1.00 | 913324 |
| 3 | 0 | 2.30 | ISLW |
| 4 | 0 | 88.20 | SRL |

Figure 11:
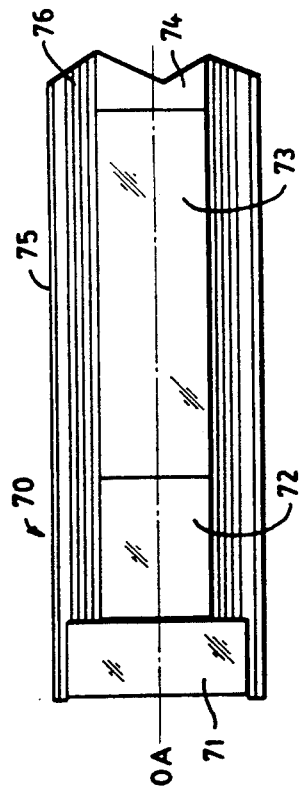
FIG. 11 is another endomicroscope embodiment of the invention with a field widening lens, a cover glass and spacer preceding the objective.

An example of a wide angle convertible embodiment is shown in FIG. 11 at 80. This embodiment includes a field widening lens 81 but in other respects is exactly the same as the previous example. To construct it with the wider angle feature, the outer cover glass 71 of FIG. 10 is replaced with a cover glass 82 with a negative rear surface 81, and the sagitta filled with a low index cement. This has the effect of providing negative power for increasing the instrument's field of view. The ability of the designer to more or less freely move the entrance aperture and the field widening lens allow considerable control over some of the aberrations of these systems. Constructional data is as follows:

TABLE FOR WIDE ANGLE CONVERTIBLE
ENDOMICROSCOPE FORM

| Surface | Curvature | Thickness | Glass |
|---|---|---|---|
| 1 | 0 | 1.00 | 913324 |
| 2 | 0.50 | 0.05 | NOR61 |
| 3 | 0 | 1.00 | 913324 |
| 4 | 0 | 2.30 | ISLW |
| 5 | 0 | 88.20 | ISLW |

A double ray trace of the wide angle convertible endomicroscope embodiment which demonstrates a number of features of the invention follows:

RAY TRACE TABLE FOR WIDE ANGLE ENDOMICROSCOPE
AT TWO OBJECT DISTANCES

| Surface | Thickness | Glass | Heights | | | |
|---|---|---|---|---|---|---|
| | | | Axial | Chief Ray | Aperture Height | Extreme Ray |
| 0 | 12.0000 | AIR | 0.0000 | −7.1952 | — | 12.0000 |
| | 0.7091 | " | " | −0.4139 | | 0.4139 |
| 1 | −0.6736 | AIR | 0.0954 | 0.0000 | 0.5000 | 0.0954 |
| | −0.7091 | " | 0.0980 | 0.0000 | " | 0.0980 |
| 2 | 0.5000 | 913324 | 0.0900 | −0.4039 | 0.5000 | 0.4139 |
| | " | " | 0.0000 | −0.4139 | " | " |
| 3 | 0.0500 | Cement | 0.0921 | −0.2472 | 0.3000 | 0.2638 |
| | " | " | 0.0361 | −0.2613 | | |
| 4 | 1.0000 | 913324 | 0.0934 | −0.2308 | 0.3000 | 0.2490 |
| | " | " | 0.0410 | −0.2456 | " | " |
| 5 | 2.30 | ISLW | 0.1145 | 0.0371 | 0.5000 | 0.1204 |
| | " | " | 0.1199 | 0.0113 | " | " |
| 6 | 0.7037 | SLR | 0.0501 | 0.4973 | 0.5000 | 0.5000 |

-continued

RAY TRACE TABLE FOR WIDE ANGLE ENDOMICROSCOPE
AT TWO OBJECT DISTANCES

| Surface | Thickness | Glass | Axial | Chief Ray | Aperture Height | Extreme Ray |
|---|---|---|---|---|---|---|
|  | 2.2394 | " | 0.1571 | 0.4747 | " | " |
| 7 | 11.0250 | SRL | 0.0000 | 0.4999 | 0.5000 | 0.5000 |
|  | " | " | 0.0002 | 0.5000 | " | " |
| 8* | 76.4713 | SRL | −0.5000 | 0.0000 | 0.5000 | 0.5000 |
|  | 74.9356 | " | −0.5000 | 0.0000 | " | " |
| 9 | 0.4252 | AIR | 0.0484 | 0.4975 | 0.5000 | 0.5000 |
|  | 1.4301 | " | 0.1555 | 0.4752 | " | " |
| 10 | — | — | 0.0000 | 0.5022 | — | — |
|  | — | — | " | 0.5261 | — | — |

*Aperture stop

The above ray trace table shows the values for two object positions, one for a distance of 12 mm and one for an object in contact with the cover glass; the values for the second object position being listed just below the corresponding values for the first. Where the second value is identical a quote (") mark has been used to make it stand out. Note also the changes in the thicknesses of some, but not all, of the surfaces. In both cases the total length of the relay is two periods. The difference in magnification is approximately 18 times.

Figure 12:
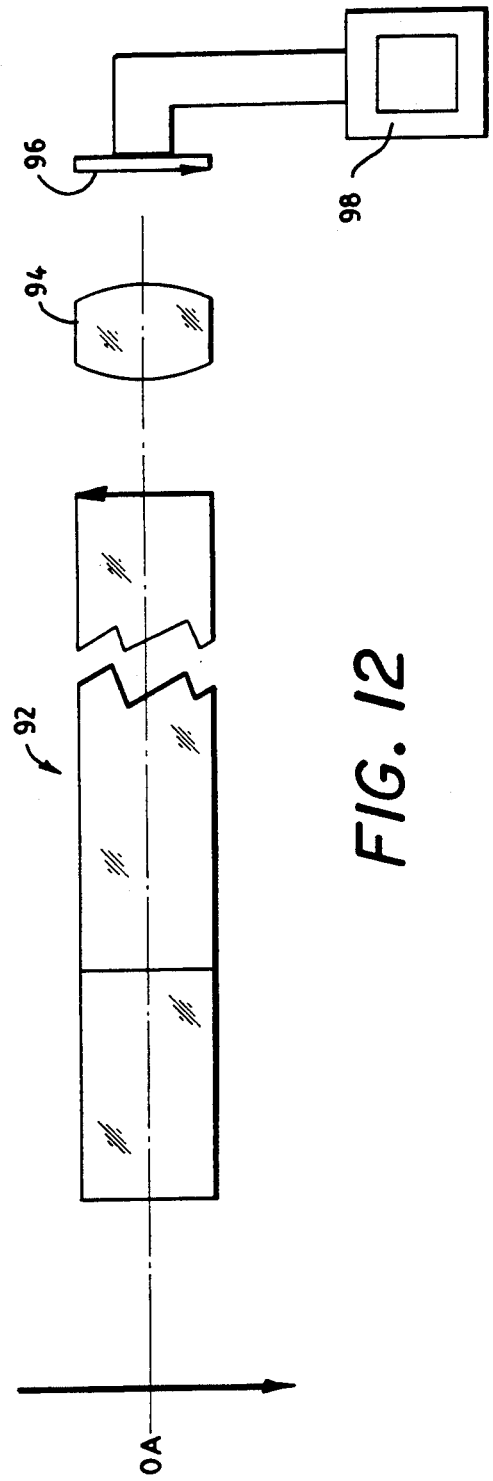
FIG. 12 is another embodiment of the invention incorporating features for viewing and/or recording images by either photographic or video means.

As already mentioned, the inventive embodiments can be used with a video sensor to provide video signals that can be recorded or viewed in the usual way employing widely available video equipment for this purpose. As shown in FIG. 12, this can be accomplished by substituting a relay lens 94 and a videosensor 96 following the inventive relay designated here as 92. The output of video sensor 96 may then be displayed on a monitor 98 and/or recorded on a tape unit (not shown).

Figure 13:
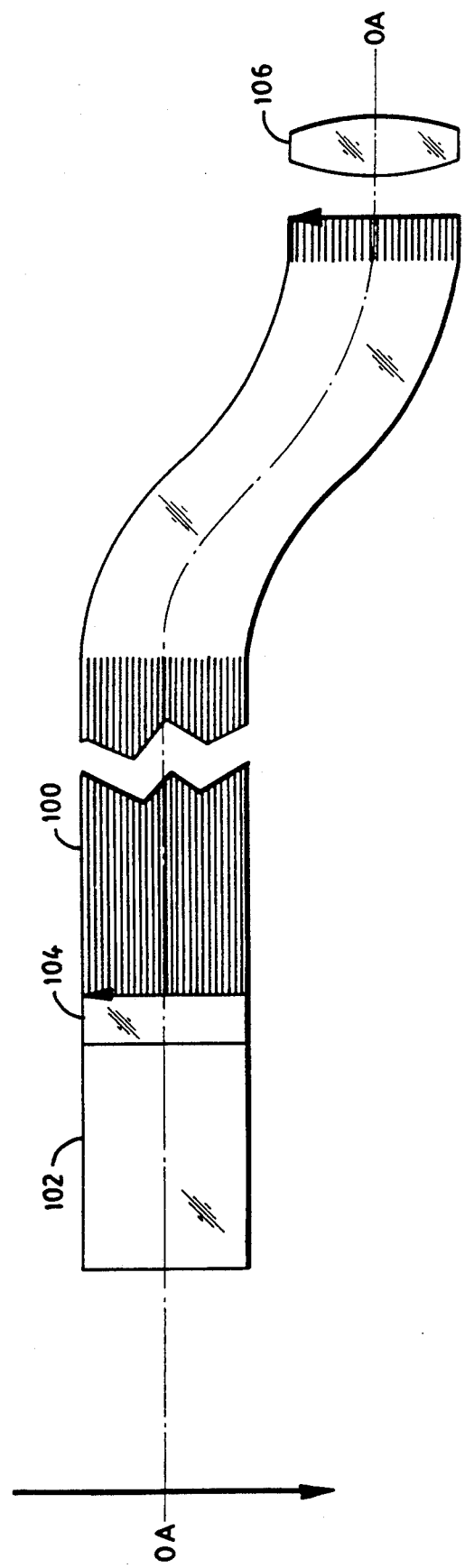
FIG. 13 is another embodiment similar to the basic embodiment of FIG. 1 but with a portion of the relay followed by a coherent fiberoptic bundle.

In addition to the foregoing embodiments, it is possible to use a fiber optic bundle following the relay section to further pass the image over longer distances or provide a flexible endoscope by cutting off the relay at the first image position and providing a fiberoptic image guide to provide a flexible endoscope. Such a scheme is shown in FIG. 13 where one end of a coherent fiber optic bundle 100 is placed at the location of the image formed by preceding objective 102, which is less than one-quarter period in length, and relay 104, which is exactly the right length to form an image of the desired field on its rear surface. Coherent bundle 100 may be flexible and of any sensible length and, as is well-known, operates to transfer the image on its front face to its opposite face where it may be observed with a suitable ocular 106 or be relayed to a videosensor as indicated in FIG. 12.

Still other embodiments of the invention may be made by those skilled in the art using the methodology described to apply its new discovered principles. Therefore, it is intended that the examples given be considered only illustrative and not be construed in a limiting sense. The design methodology described may be coded in well-known manners so that it may be implemented via computer. Consequently, the scope of the invention is given by the claims to follow.

What is claimed is:

1. An endoscopic optical system comprising a gradient index objective lens having a length less than one-quarter of its period followed by a gradient index relay lens for transferring image forming rays emerging from said gradient index objective lens further downlight thereof, said endoscopic optical system having an entrance tunnel that is located forward of an outside said gradient index objective lens and that is, by definition, the image in object space of those apertures following said gradient index objective lens which limit the light ray bundles from all points in the object field.

2. The optical system of claim 1 wherein said gradient index relay lens has a length that is at least one-quarter period longer than the distance of the first image of the object into said gradient index relay lens.

3. The endoscopic optical system of claim 1 further including a line-of-sight prism preceding said gradient index objective lens for changing the direction of view of said endoscopic optical system from a direction along its longitudinal optical axis to one that is inclined to its longitudinal optical axis, said line-of-sight prism and said entrance tunnel being located and arranged with respect to one another so that said endoscopic optical system is not vignetted by said prism.

4. The optical system of claim 3 further including a negative lens preceding said line-of-sight prism for increasing the field of view of said system.

5. The endoscopic optical system of claim 1 further including an ocular following and gradient index relay lens for direct observation of the objective image transferred thereby at a predetermined magnification.

6. The endoscopic optical system of claim 1 further including a videocamera sensor located downstream of said graded index relay lens to intercept image forming rays emerging therefrom and provide a video signal from which a well-corrected image may be displayed and/or recorded.

7. An endoscope comprising:
   (a) a gradient index objective lens having a length that is less than one-quarter of its period and a given numerical aperture; and
   (b) a gradient index relay lens following said gradient index objective lens, axially aligned therewith, and having a numerical aperture smaller than that of said gradient index objective lens, said gradient index relay lens having a length that is at least one-quarter period longer than the distance of the first image of the object formed inside of said gradient index relay lens,
   said endoscope being so structured and arranged that:
   (1) it has an entrance tunnel that is located forward of and outside said gradient index objective lens and is, by definition, the image in object space of those apertures following said gradient index objective lens which limit the light ray bundles from all points in the object field, and (2) the first image formed by said gradient index objective lens is inside of said gradient index relay lens.

8. The endoscope of claim 7 further including a line-of-sign prism preceding said gradient index objective lens for changing the direction of view of said endoscope from a direction along its longitudinal optical axis to one that is inclined to its longitudinal optical axis, said prism and said entrance tunnel being located and arranged with respect to one another so that there is substantially no vignetting of said endoscope by said prism.

9. The endoscope of claim 8 further including a negative lens preceding said line-of-sight prism for increasing the field of view of said endoscope.

10. The endoscope of claim 7 further including an ocular following said gradient index relay lens for directly observing at a predetermined magnification the objective image transferred thereby.

11. The endoscope of claim 7 further including a videocamera sensor located downstream of said gradient index relay lens to intercept image forming rays emerging therefrom and provide a video signal from which a well-corrected image may be displayed and/or recorded.

12. The endoscope of claim 7 wherein said gradient index objective lens and said gradient index relay lens are cemented together and hermetically sealed to prevent entry into said endoscope of dust, moisture, or other foreign matter.

13. The endoscope of claim 7 wherein the said first image formed by said gradient index relay lens is located substantially on its back surface.

14. The endoscope of claim 7 further including an ocular lens located downstream of said gradient index relay lens for observing the image transferred thereby, said ocular lens having a numerical aperture larger than that of said gradient index relay lens.

15. An endomicroscope comprising in sequence from object to image space:
(a) a gradient index objective lens having a length that is less than one-quarter of its period and a given numerical aperture;
(b) a gradient index relay lens following said gradient index objective lens, axially aligned therewith, and having a numerical aperture smaller than that of said gradient index objective lens, said gradient index relay lens having a length that is at least one-quarter period longer than the distance of the first image of the object inside of said gradient index relay lens, and
(c) an ocular lens for providing a magnified viewable image of the image transferred by said gradient index relay lens,
said endoscope being so structured and arranged that:
(1) it has an entrance tunnel that is located forward of and outside said gradient index objective lens and that is, by definition, the image in object space of those apertures following said gradient index objective lens which limit the light ray bundles from all points in the object field, and (2) the first image formed by said gradient index objective lens is inside of said gradient index relay lens.

16. The endomicroscope of claim 15 wherein said ocular lens is instead a video sensor together with a video system for forming an image that may be viewed on a monitor or recorded.

17. The endomicroscope of claim 15 further including means for changing the focus of said ocular lens to convert said endomicroscope from a high-magnification, narrow field-of-view instrument to a lower magnification, wider field-of-view endoscope.

18. The endomicroscope of claim 15 further including a cover glass forward of said gradient index objective lens.

19. The endomicroscope of claim 18 wherein at least said cover glass, said gradient index objective lens, and said gradient index relay lens are cemented together and hermetically sealed to prevent dust, moisture, or other foreign matter from entering at least the distal end of the optical path of said endomicroscope.

20. The endomicroscope of claim 18 further including, uplight of said cover glass, a negative field widening lens to increase the field-of-view of said endomicroscope.

21. The endomicroscope of claim 20 further including an additional cover glass having a rear surface and wherein said negative field widening lens is formed as an integral part of said rear surface of said additional cover glass.

* * * * *